July 15, 1958 K. G. HUNTLEY 2,843,736

CHARGING OR DISCHARGING CIRCUITS FOR CONDENSERS

Filed Oct. 7, 1953 2 Sheets-Sheet 1

INVENTOR
KEITH GORDON HUNTLEY
BY Glascock Downing & Seebold
ATTORNEYS

July 15, 1958 K. G. HUNTLEY 2,843,736

CHARGING OR DISCHARGING CIRCUITS FOR CONDENSERS

Filed Oct. 7, 1953 2 Sheets-Sheet 2

INVENTOR
KEITH GORDON HUNTLEY
BY Mascock Downing & Seebold
ATTORNEYS

United States Patent Office 2,843,736

Patented July 15, 1958

2,843,736

CHARGING OR DISCHARGING CIRCUITS FOR CONDENSERS

Keith Gordon Huntley, Harlington, Hayes, England, assignor to Electric & Musical Industries Limited, Hayes, Middlesex, England, a British company Application October 7, 1953, Serial No. 384,540

Claims priority, application Great Britain October 17, 1952

8 Claims. (Cl. 250—27)

This invention relates to charging or discharging circuits for condensers and it relates especially but not exclusively to integrating and charge storage circuits.

In Figure 1 of the accompanying drawings there is illustrated diagrammatically a known form of integrating circuit which is basically a so-called "Miller" integrator, such as described for example in the specification of United States patent application Serial No. 592,641, now Patent No. 2,692,334, issued October 19, 1954. The circuit comprises a phase reversing amplifier 1 whose gain is required to be greater than the reciprocal of the accuracy required in the integration, the amplifier being merely shown in schematic form since it may be of a variety of constructions. The input and output electrodes of the amplifier are denoted by 2 and 3 respectively and the integrating condenser 4 is connected between these electrodes to provide a negative feedback path for the amplifier. The integrating resistance 5 leads to the condenser 4 from the input terminal 6 and an electronic switch 7, denoted merely in block form, is inserted between the resistance 5 and condenser 4. A further electronic switch 8 for discharging the condenser 4 when desired is connected across the condenser. The switches 7 and 8 are bi-directionally conductive to allow either positive or negative potentials at the terminal 6 to be integrated and they are arranged to be operated in known manner by switching pulses from sources 9 and 10.

In operation of the circuit, the potential to be integrated is applied to the terminal 6 and the integrated output is set up at the output terminal 11, the switch 7 being closed and the switch 8 open during integration. At the end of the interval over which integration is desired, the switch 7 is opened and the output is thereupon maintained at 11 until the switch 8 is closed to discharge the condenser and re-set the output to a datum level.

The circuit illustrated has, however, certain practical disadvantages. For instance the fact that both ends of the condenser 4 are floating involves the use of a switch 8 which has a relatively high series resistance in the conductive path when the switch is closed so that re-setting of the circuit is slower than sometimes desirable. A usual form of switch construction is illustrated comprising diodes 12, 13 and 14, 15 connected in pairs as shown, and resistances 16 and 17. The diodes 12 and 15 are normally conducting and the resistances 16 and 17 are so chosen that, in this state of the diodes, the anode of the diode 13 is biassed negatively and the cathode of the diode 15 is biassed positively for all possible excursions of the output potential. The switch is thus maintained open and is closed by pulses which switch off the diodes 12 and 14 and remove the biasses. For a range of output potentials of ±100 volts, the impedance of the switch illustrated may be between 1,000 and 10,000 ohms. Moreover, there is no simple way of shifting the potential level at which the output on 11 is re-set on discharging the condenser 4 through the switch 8.

Similar disadvantages may arise with other circuits where it is desired to charge or discharge a condenser rapidly to a given level, and an object of the present invention is to mitigate the disadvantages aforesaid.

A further object of the present invention is to provide a circuit for charging or discharging a condenser comprising a condenser, an amplifier having an input circuit and an output circuit, a negative feedback path from said output circuit to said input circuit to lower the output impedance of said amplifier, and a switch connecting said condenser in said output circuit to cause said amplifier to charge (or discharge) said condenser through said output impedance, whereby said condenser can be charged (or discharged) at predetermined times to a level representing a potential applied to said input circuit.

In order that the said invention may be clearly understood and readily carried into effect, the same will now be more fully described with reference to the accompanying drawings.

Figure 1:
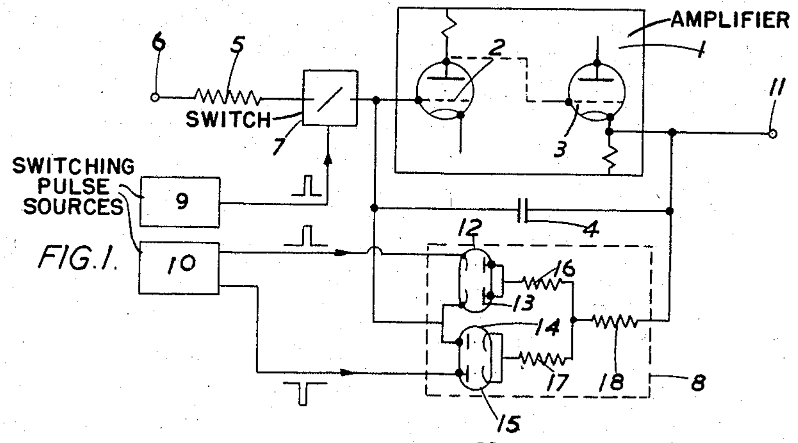
Figure 1 illustrates as aforesaid a known form of integrating circuit.
Figures 2, 3:
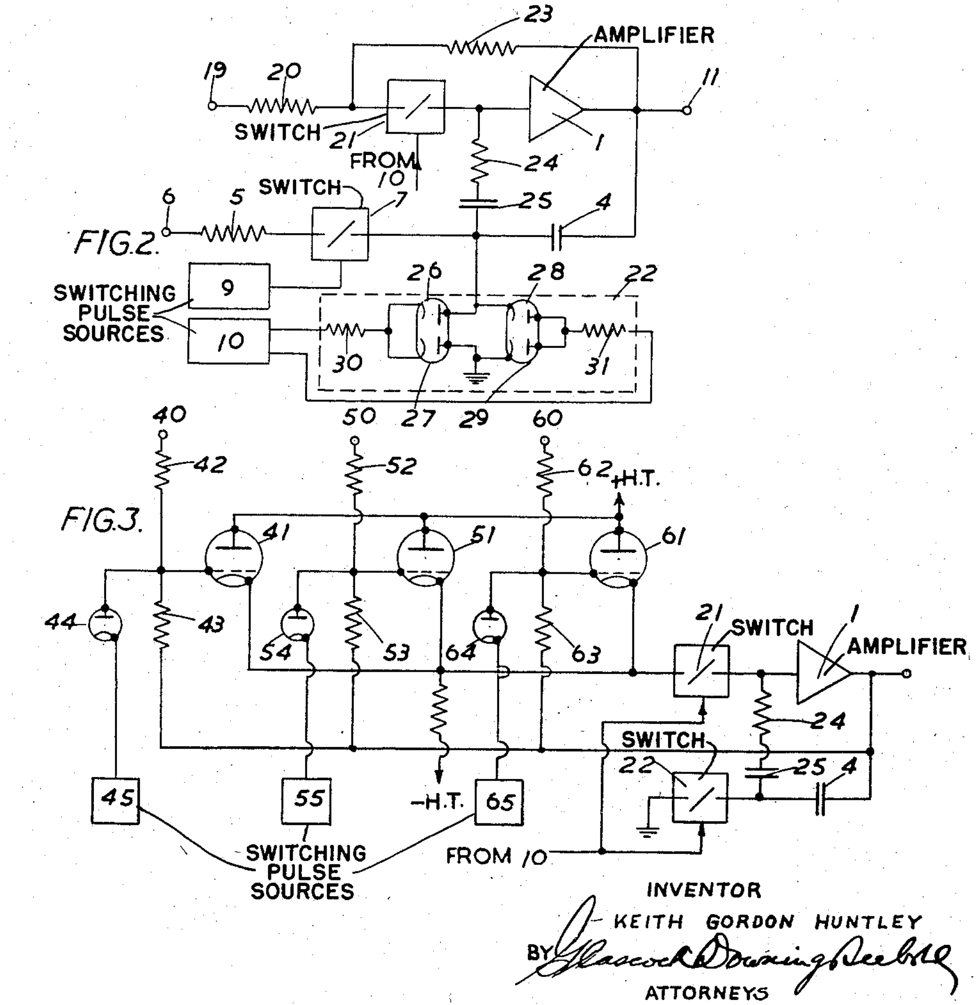
Figure 2 illustrates one example of the present invention applied to an integrating circuit of the kind illustrated in Figure 1.
Figure 3 illustrates another application of the present invention to a charge storage circuit, and Figure 4, which illustrates in more detail one practical form of the arrangement shown in Figure 2.

The integrating part of the circuit shown in Figure 2 is basically the same as that shown in Figure 1 and corresponding parts in the two circuits are indicated by the same reference numerals. The amplifier 1 has, however, a second input terminal 19 from which a resistance 20 leads to bi-directionally conductive electronic switch 21 and thence when the switch is closed to the input electrode of the amplifier 1. A further bi-directionally conductive electronic switch, the components of which are enclosed within the dotted outline 22, is connected from the junction of the switch 7 and the condenser 4 to ground. The two switches 21 and 22 replace the switch 8 of Figure 1 and are operated from the pulse source 10. Although for simplicity only a single connection to the switches 7 and 21 from their respective pulse sources is indicated, it is to be understood that push-pull connections are provided, since the switches are required to be bi-directionally conductive. A feedback resistance 23 is connected from the output electrode of the amplifier 1 to the junction between the resistance 20 and the switch 21, whilst the series combination of a resistance 24 and condenser 25 is interposed between the input electrode and the junction of the switch 7 and the condenser 4. The condenser 25 is a D. C. blocking condenser and is required because the potentials at the remote sides of the switches 21 and 22 are not necessarily the same when the switches are closed. The resistance 24 is provided to improve the stability of the circuit and is required because the impedance of the switch 22 when conducting, though low, is nevertheless finite and there is a secondary and unwanted feedback path for the amplifier 1 via 4 and 25 which on closing the switch 22 is liable, in the absence of the resistance 24, to give rise to a transient in the form of a damped oscillation. Since the switch 22 is connected at one side to ground, it may be of a low impedance construction and as illustrated it comprises diodes 26, 27, 28 and 29 connected in a bridge arrangement with the cathodes of the diodes 26 and 27 connected to the pulse source 10 via a resistance 30 and with the anodes of the diodes 28 and 29 connected to the pulse source 10 via a resistance 31. The switch 21 may be of any suitable construction, such as that of 8 of Figure 1.

With the switches 21 and 22 open and the switch 7 closed, the circuit of Figure 2 operates to integrate such potential as may be applied to the input terminal 6 in the same manner as described with reference to Figure 1, the integral being set up at the terminal 11. Resetting of the circuit is, however, achieved by opening the switch 7 and closing the switches 21 and 22. With the switch 21 closed and the switch 7 open, terminal 19 becomes the effective input terminal of the amplifier 1 and by virtue of the negative feedback now provided through the resistance 23, the amplifier operates as a so-called "see-saw" amplifier with a very low output impedance. The operation of a "see-saw" amplifier is described for example in "The Journal of the Institution of Electrical Engineers," volume 93, part IIIA, page 303. Closing the switch 22 switches the condenser 4 across the output of the amplifier so that the condenser 4 can discharge through the switch 22 and the output impedance. The gain of the forward path ($\mu$) of the amplifier 1 may for example, be of the order of 2000, and with a gain of this order the output impedance of the amplifier, when it is conditioned to operate as a see-saw amplifier may be a fraction of an ohm, and therefore the effective discharging time constant for the condenser 4 is determined by the impedance of the switch 22 which, if it is of the construction shown, may be between 200 and 1,000 ohms for an output potential in the range $\pm 100$ volts. The discharging time constant for the condenser 4 is therefore much less than in the circuit of Figure 1, being reduced by a factor of between 5 and 10 in comparable circumstances. Moreover, in amplifiers of the see-saw type the output potential is fixed within close limits by the potential applied to the input terminal, and is substantially independent of valve characteristics and circuit component valves, so that by adjusting the potential at the terminal 19 the re-setting level of the integrating circuit can be simply adjusted. It is thus possible to re-set the output to earth potential, or at a positive or negative potential as desired.

One practical application of the circuit shown in Figure 2 is for generating a scanning waveform for deflecting the beam of a cathode ray tube in one coordinate direction where it is required to produce a radial scan by integrating potentials proportional to cos $\theta$ and sin $\theta$, $\theta$ being the direction angle of the radius. In such an application, since integration is required to restart immediately on completion of the resetting operation, the switch 7 may be dispensed with. In this case it is possible to shift the centre of the scan, if desired, merely by adjusting the re-setting level of the output at 11. Moreover, although the switch 22 does not have zero impedance when the switch is closed the presence of the condenser 25 permits the output potential to be set to exactly the same value irrespective of the potential applied to the input terminal 6, thus avoiding any tendency to expand the central spot formed by the scanning beam into a small circle.

The circuit of Figure 2 can also be utilised for interlacing marker lines joining two positions in a radar display. In this application, the starting position of the marker line is determined by the potential applied to the terminal 19 and a potential proportional to the difference between (say) the $x$ co-ordinates to the starting and final positions is applied to the terminal 6. The waveform for producing the $x$ component of the marker lines is then produced by opening the switches 21 and 22 and closing the switch 7 for a standard time T which is predetermined to produce the appropriate deflecting amplitude. For instance, if the input potentials at 19 and 6 are to the same scale and the resistances 5 and 20 equal, the time T required is equal to the time constant of condenser 4 and resistance 23.

Figure 4:
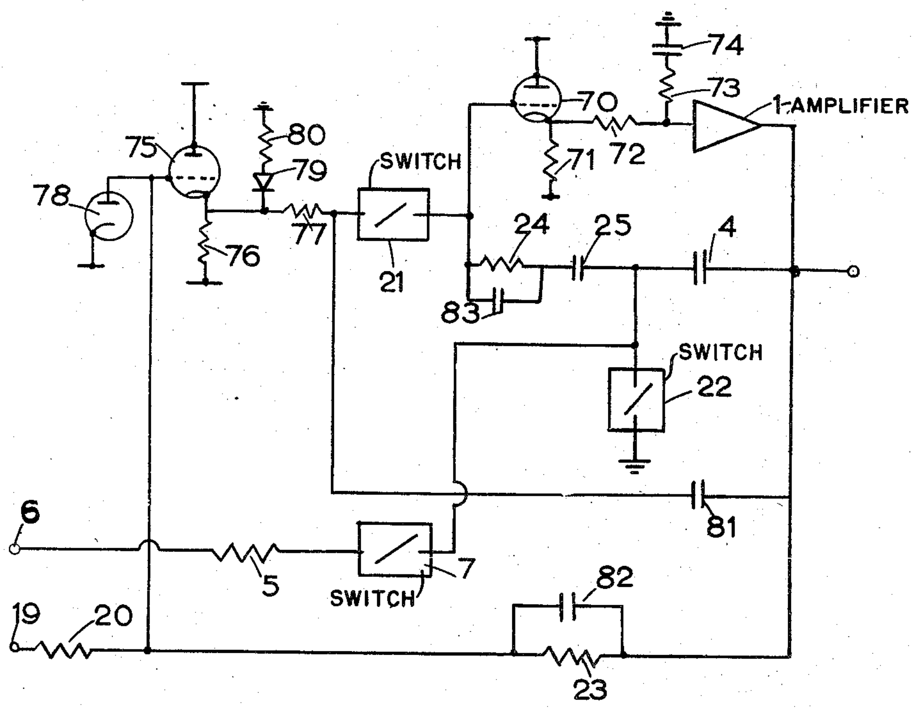

Figure 4 is in general similar to Figure 2 and corresponding parts in Figures 2 and 4 have been given the same reference numerals. In the circuit shown in Figure 4 the input electrode of the amplifier 1 is fed through a valve 70 which operates as a cathode follower by virtue of the resistance 71 in its cathode lead. As shown the cathode of the valve 70 is connected to the amplifier 1 through a series resistance 72 and across a shunt resistance 73 and condenser 74, the elements 72, 73 and 74 being inserted for the purposes of stabilising the amplifier 1 and determining the form of response obtainable. A valve 75, also connected as a cathode follower by virtue of a resistance 76 in its cathode lead, is introduced between the junction of the resistances 20 and 23 on the one hand and the switch 21 on the other hand, the cathode of the valve 75 being connected to the switch 21 through the series resistance 77. Catch diodes 78 and 79 are connected respectively to the control electrode and cathode of the valve 75, the diode 79 being grounded through the series resistance 80. Moreover, the amplifier 1 has an additional feedback path through a condenser 81, and the resistances 23 and 24 respectively are shunted by condensers 82 and 83.

The operation of the arrangement shown in Figure 4 is the same as Figure 2. The cathode follower circuit 70, 71 is provided to give a low input impedance for the amplifier 1 so that the loop gain is not appreciably reduced due to the presence of the condenser 74. The cathode follower circuit 75, 76 is introduced so as to make the internal impedance of the feedback path into the control electrode of the valve 70 small compared with the resistance 24. If this condition is not fulfilled, the purpose of the resistance 24 is nullified. The additional feedback path via the condenser 81 is provided to limit the re-setting rate of the condenser 4 so that the discharging or charging current through the condenser 4 does not exceed the capacity of the output stage of the amplifier 1. When the circuit of Figure 4 is conditioned for integration or storage the condenser 81 is ineffective. The condensers 82 and 83 are included to limit any phase shift produced by the resistances 23 and 24 respectively in conjunction with stray capacities associated with these resistances. The condensers 82 and 83 are therefore effective to improve the stability of the circuit.

In the example of the invention illustrated in Figure 3 the input terminal 6 integrating resistance 5 and switch 7 are not employed. The switch 21 is, moreover, associated with an electronic selector switch of the construction described in the specification of United States patent application Serial No. 377,658 so that the condenser 4 can be caused to observe and store a voltage representative of the amplitude of a selected one of a number of input signals. The input signals to be selected are applied to input terminals 40, 50 and 60 (only three such terminals being shown for simplicity although the number may be larger). The input signals may be, for example, of sinusoidal waveform of any amplitude including negative valves and the observing pulses timed to occur at the peaks of the successive signals. The selector switch comprises valves 41, 51 and 61 having control electrodes connected to the terminals 40, 50 and 60 by feed resistances 42, 52 and 62 respectively. Feedback resistances 43, 53 and 63 are, moreover, connected from the output terminal 11 of the amplifier 1 to the control electrodes of the valves 41, 51 and 61 and the control electrodes are connected via diodes 44, 54 and 64 to sources of selector pulses indicated diagrammatically at 45, 55 and 65. As described in the aforementioned patent application, the diodes 44, 54 and 64 are normally biassed to the conducting state from the sources 45, 55 and 65 whereby the valves 41, 51 and 61 are held in the non-conducting state. The selector pulses from the sources 45, 55 and 65 are arranged to be synchronised with the peaks of the input waveforms in such a way that each of the valves 41, 51 and 61 is switched on (due to switching off of the corresponding diode by a selector pulse) when the corresponding input waveform has its peak value. Moreover, the switching pulses for the switches 21 and 22 are such that both these switches are maintained closed for the duration of each selector pulse. Assuming for example that the valve 41 has been rendered conducting by a selector pulse from the source 45 the feed resistance 42 and the feedback resistance 43 cause the amplifier 1 in conjunction with the valve 41 to function as a "see-saw" amplifier exactly as the amplifier 1 in Figure 2. Therefore the condenser 4 is charged to cause the output voltage at the terminal 11 to bear a fixed value representative of the value of the input waveform at the terminal 40 during the selector pulse in question. On the termination of the selector pulse and the opening switches 21 and 22, the output of the amplifier 1 is stored by the condenser 3 until the next selector pulse occurs, say a pulse from the source 55, whereupon the output of the amplifier 1 is set to the value of the input waveform at the terminal 50 at the corresponding time and maintained thus until the next selector pulse, this cycle of operations being repeated indefinitely.

The circuit of Figure 3 has the advantage that its response is rapid to changes in input level so that it can be employed, for example, as what may be termed a switched rectifier, for converting A. C. analogue potentials in parallel form into D. C. analogue potentials in series form.

A circuit similar to that shown in Figure 3 without the selector switch can be used for observing and storing values of a single input variable at discrete times determined by the switching pulses applied to the switches 21 and 22. In such a case an observed value may be stored for as long as the accuracy is not reduced, by leakage from the condenser 3, below the required value.

What I claim is:

1. A circuit for charging or discharging a condenser comprising an amplifier having an input electrode and an output electrode, a negative feedback circuit from said output electrode to said input electrode to lower the output impedance of said amplifier, switch means for rendering said paths selectively effective and ineffective, a condenser having an electrode connected to said output electrode, further switch means connected from the other electrode of said condenser to a point of substantially fixed potential, and an impedance connected from said other electrode of said first condenser to said input electrode whereby said condenser can be charged or discharged to a level representing a potential applied to said input electrode on closing said first and further switch means.

2. A circuit for charging or discharging a condenser comprising an amplifier having an input electrode and an output electrode, an input path leading to said input electrode, a negative feedback path from said output electrode to said input electrode, first switch means for selectively open-circuiting and close-circuiting said paths, a first condenser having one electrode connected to said output electrode, second switch means connected from the other electrode to said first condenser to a point of substantially fixed potential, and a second condenser connected in a path from said other electrode of said first condenser to said input electrode, whereby said first condenser can be charged or discharged to a level representing a potential applied to said input path on closing both said switch means, and can be conditioned for charge storage on opening both said switch means.

3. A circuit according to claim 2 comprising a second input path including an integrating resistance leading to said input electrode, whereby a potential applied to said second input path can be integrated into said first condenser when said first condenser is conditioned for charge storage.

4. A circuit according to claim 3 comprising further switch means for selectively open-circuiting and close-circuiting said second input path.

5. A circuit for charging or discharging a condenser comprising a phase reversing amplifier having an input electrode and an output electrode, an input path including resistance leading to said input electrode, a negative feedback path including resistance from said output electrode to said input electrode, first switch means for selectively open-circuiting and close-circuiting said paths, said amplifier operating as a see-saw amplifier on close-circuiting said path, a first condenser having an electrode connected to said output electrode, second switch means connected from the other electrode of said first condenser to a point of substantially fixed potential, and a second condenser included in a path from said other electrode of said first condenser to said input electrode, whereby said first condenser can be charged or discharged to a level representing the potential applied to said input path when both switch means are closed, and can be conditioned for charge storage when both said switch means are open.

6. A circuit according to claim 5 comprising a second input path including an integrating resistance leading to said input electrode whereby a potential applied to said second input path can be integrated into said first condenser when said first condenser is conditioned for charge storage.

7. A circuit for charging or discharging a condenser comprising an amplifier having an input electrode and an output electrode, a plurality of input paths, means for selectively coupling said input paths to said input electrode, a negative feedback path from said output electrode to said input electrode, first switch means for selectively open-circuiting and close-circuiting the selected path and said negative feedback path, a first condenser having one electrode connected to said output electrode, second switch means connected from the other electrode of said first condenser to a point of substantially fixed potential, and a path including a second condenser from said other electrode to said first condenser to said input electrode, whereby said first condenser can be charged or discharged to a level representing the potential applied to the selected input path when both switch means are closed and can be conditioned for charge storage when both switch means are open.

8. A circuit according to claim 7, said selective coupling means comprising a plurality of valves, one for each input path, each valve having an input electrode coupled to the corresponding path and an output electrode coupled to said input electrode of said amplifier, and said negative feedback path being connected from said output electrode of said amplifier to said input electrode of said amplifier via the input electrodes of said valves.

References Cited in the file of this patent

UNITED STATES PATENTS

| | | |
|---|---|---|
| 2,251,973 | Beale et al. | Aug. 12, 1941 |
| 2,594,104 | Washburn | Apr. 22, 1952 |
| 2,607,528 | McWhirter et al. | Aug. 19, 1952 |
| 2,627,574 | Feldman | Feb. 3, 1953 |
| 2,662,197 | Comte | Dec. 8, 1953 |